April 17, 1956     P. V. RESKO ET AL     2,742,106
TRAP
Filed Dec. 23, 1953     2 Sheets-Sheet 1
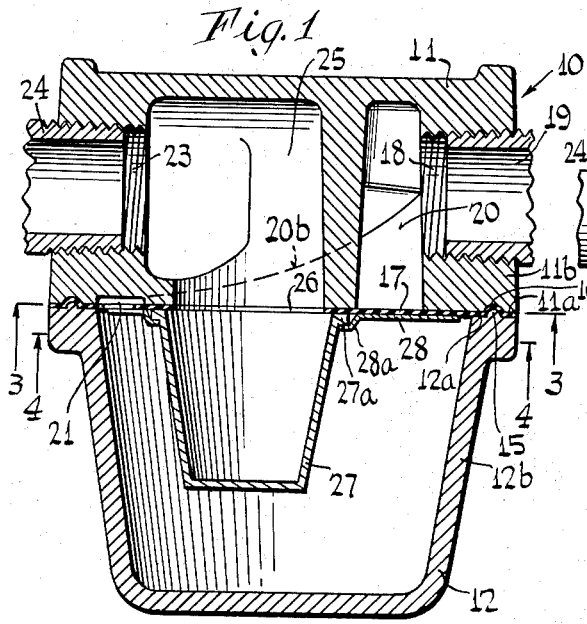
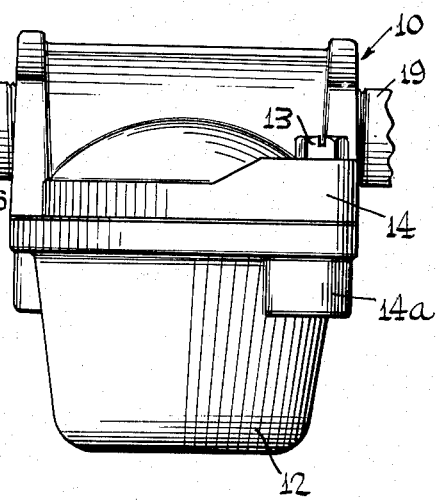
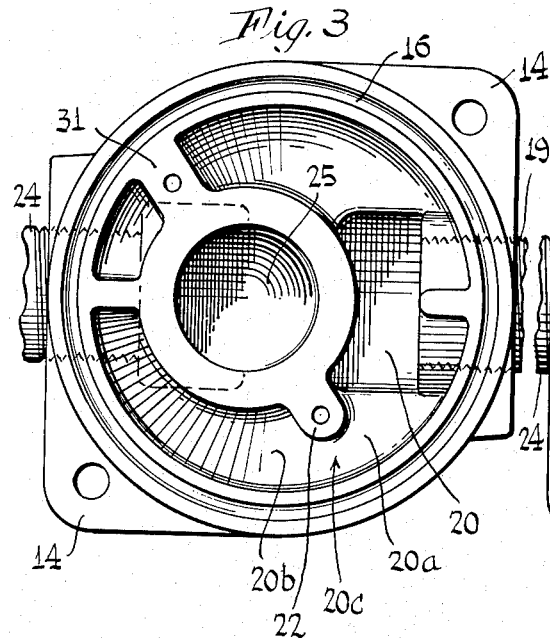
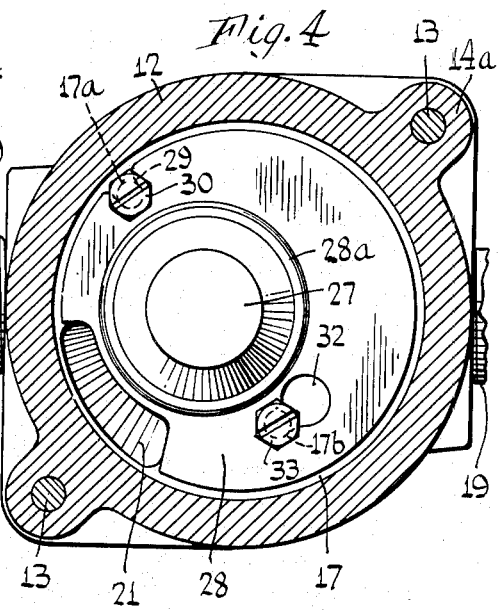
INVENTORS
Paul V. Resko
Fairchild Whitworth
Charles W. Stewart
BY Johnson and Kline
ATTORNEYS

United States Patent Office 2,742,106
Patented Apr. 17, 1956

2,742,106

TRAP

Paul V. Resko, Bridgeport, and Charles W. Stewart and Fairchild Whitworth, Fairfield, Conn., assignors to Sprague Meter Company, Bridgeport, Conn., a corporation of Connecticut Application December 23, 1953, Serial No. 400,044

9 Claims. (Cl. 183—67)

The present invention relates to a device for separating solids from a fluid, and more particularly for the removal of dust from gas.

The presence of dust in gas lines has long been a problem, since the dust is carried by the gas and tends to foul and otherwise damage regulators, meters and appliances through which the gas passes. Efforts have been made to remove the dust carried by the gas but these have involved expensive apparatus and complicated piping connections.

The present invention overcomes these difficulties by providing an inexpensive dust trap which is of simple construction, which can be readily assembled and serviced, and which can be easily installed even in existing lines without complicated piping connections. This is accomplished, according to the present invention, by providing a housing which is divided by a partition wall into a connector part to which the line connections are made, and a trap chamber for collecting and holding the dust separated from the gas.

The device of the present invention is inexpensive to manufacture and assemble, as it may be made of suitable castings and stampings which may be readily assembled. It has no moving parts and it can be easily taken down for cleaning and replacement of the filters as required.

By selecting the desired arrangement of the inlet and outlet ports on the connector part the device of the present invention can be easily inserted directly into a gas line ahead of the regulator, meter or appliance without additional piping, and will effectively operate to remove the dust before it can do damage to these devices.

A feature of the present invention resides in the fact that the dust trap can be installed in vertical or in horizontal pipe lines and will operate equally effectively in either installation.

Other features and advantages will be apparent from the specification and claims when considered in connection with the drawings in which:

Figure 1 shows a longitudinal sectional view of the dust trap of the present invention applied to a horizontal pipe line.

Fig. 2 is a side view of the device of the present invention.

Fig. 3 is a sectional view taken along line 3—3 of Fig. 1.

Fig. 4 is a sectional view taken along line 4—4 of Fig. 1.

Figure 6:
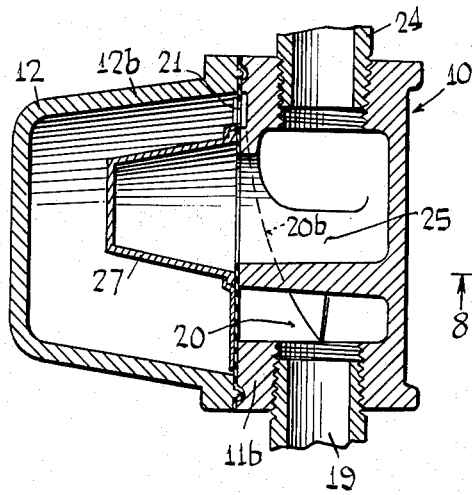
Fig. 6 shows the dust trap of the present invention installed in a vertical line.

While the device of the present invention may be used to separate solids from any fluid, it is herein illustrated as applied to the separation of dust from gas, such as illuminating gas.

As shown in Figs. 1 and 2 the device comprises a housing 10. While the housing may be made in any desired manner it is herein illustrated as being formed by two castings, one casting 11 forming the connector part to which the lines are connected and the other casting 12 being a dome-like bowl forming the dust trap chamber. The two castings are clamped together by bolts 13 passing through an ear 14 on casting 11 and into a boss 14a on casting 12.

While the cooperating faces 11a, 12a on the side walls 11b, 12b of the castings may be flat or otherwise shaped, it is at present preferred to form them with cooperating tongue and groove portions 15, 16 which assist in aligning the castings and also cooperate to form a seal for the housing, as will be described.

Figure 5:
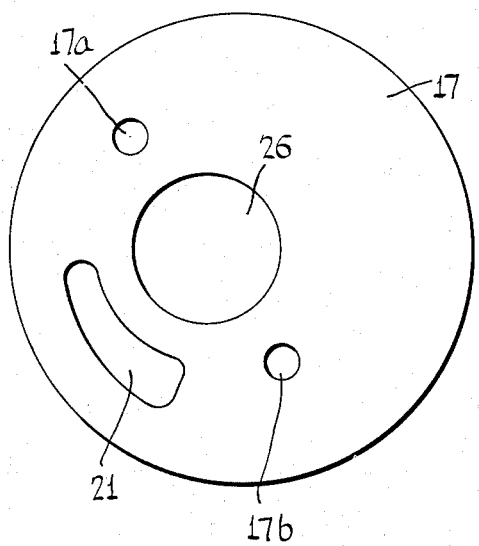
Fig. 5 is a plan view of a partition wall.

In carrying out the present invention, a partition wall 17 is provided within the housing so as to divide the housing and separate the connector part from the dust chamber. While the wall may be formed integrally with one of the castings, it is herein illustrated as a separate member which is assembled with the housing and extends across the entire housing. Preferably the wall is provided with marginal portions which extend outwardly and are secured between the housing sections to form a seal therefor. This wall may be made of any suitable material capable of forming a barrier for dust. It is herein illustrated as being formed of a neoprene or the like material which is cut or otherwise formed to the required shape as shown in Fig. 5. When it is installed it has its peripheral portion disposed between the tongue and groove sections as shown in Fig. 1 so that in addition to forming a partition wall, it also forms a gasket or sealing means for the housing parts.

The connector part has an inlet port 18 in the side wall thereof, as shown in Fig. 1, which is adapted to be connected to the inlet pipe 19. The inlet port opens on a passage 20 formed in the connector part which passage, as shown in Fig. 3, has a curved portion 20a and extends through an arc of substantially 180°. Also, as is clear from Fig. 1, the bottom wall 20b of the passage slopes downwardly as it leaves the intake port to the point where it opens onto an opening or aperture 21 in the partition wall, which opening communicates with the dust chamber.

If it is desired, a restriction 20c can be made in the passage so as to have the effect of increasing the velocity of the gas as it flows through the passage. This restriction is illustrated as being formed by a boss 22 extending into the passage. The increased velocity of the gas together with the curved walls of the passage will cause the gas and dust carried thereby to swirl and will tend to separate the dust and the like solids from the gas. As the gas bearing the swirling solids passes through the opening 21 into the large dust chamber, its velocity is immediately decreased. However, the particles are still swirling at a high rate of speed and they are thus separated out from the gas and are dropped into the dust trap, to be retained therein.

The connector member is also provided with an outlet port 23 which, in the form of the invention shown in Figs. 1–4, is in alignment with the inlet port 18 and it is adapted to be connected to an outlet pipe 24. The outlet port is connected by a passage 25 to a second opening 26 in the partition wall so that the gas from the trap chamber can pass through the second aperture, the passage 25 and outlet port 23, thus completing the passage of the gas through the dust trap. In order to prevent dust from the trap chamber from being carried through the outlet port, it is at present preferred to provide a filter which extends over the second aperture in the partition wall, so as to effectively prevent the dust from passing therethrough. While this filter may take many forms, it is herein illustrated as being a substantially conical, porous member 27 of sintered metal, such as bronze, with the sintering controlled so that the filter excludes dust particles of a size in excess of ten microns.

In accordance with the present invention, the filter is mounted in a manner whereby it can be readily removed and replaced or cleaned when the trap chamber has been removed to empty the collected dust therefrom. This is accomplished by providing a filter mounting plate 28 which, as herein illustrated, overlies the partition wall and is provided with a notch 29 in one edge adapted to be positioned under the head of a bolt 30 passing through opening 17a in the partition and secured in a threaded hole in the boss 31 in the connector part. The plate is also provided with a keyhole slot 32 which is adapted to pass over the head of a second bolt 33 passing through an opening 17b in the partition and into a threaded hole in the boss 22 forming the restriction. The two bolts can be tightened down so that a flange 28a on the plate engages a lip 27a on the filter and clamps it securely in position. With this construction it will be seen that merely by loosening the bolts and rotating the plate and filter about the bolt 30 in a clockwise direction as shown in Fig. 4, the filter plate will be moved to a position in which the large portion of the keyhole slot will align with the bolt and pass the head of the bolt, whereupon the notched edge can be slipped out from under the bolt 30 and the filter removed for cleaning or replacement.

To install the trap of the present invention in a horizontal line as shown in Figs. 1 to 4, it is merely necessary to cut the line and thread the ends of the inlet and outlet pipe so that they can be received directly into the inlet and outlet ports, thus avoiding the requirement for any complicated pipe connections.

When it is desired to mount the dust trap in a vertical line, it is inserted in the manner shown in Fig. 6, wherein the inlet port 18 is positioned in the lower wall so that the gas coming from the inlet pipe 19 moves up through the passage 20, through the aperture 21 in the partition wall and into the dust chamber. In this installation the restriction 20c in the passage 20 which increases the velocity of the gas will not only tend to agitate the gas to separate the particles but will also assist in carrying the particles upwardly so that they will pass through the opening 21 in the partition wall. After the dust particles are carried through the opening they will drop into the dust chamber as described before. It will be noted, however, that the bottom of the partition wall adjacent the inlet port effectively prevents any of these dust particles from returning into the inlet passage.

Figure 7:
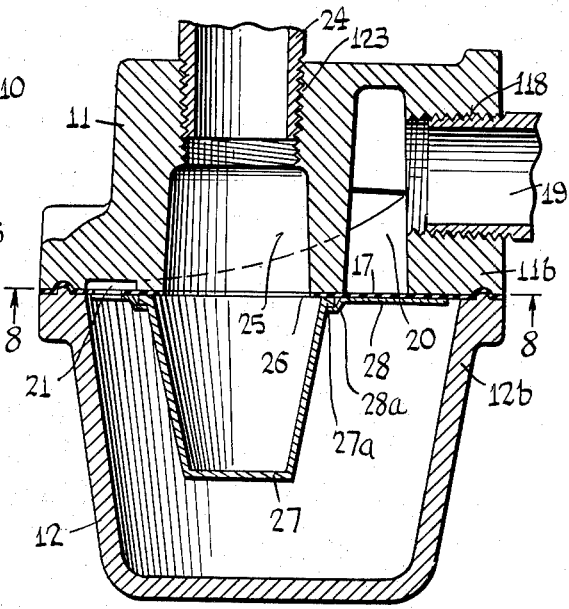
Fig. 7 is a longitudinal sectional view of the device of the present invention with the inlet and outlet ports displaced through 90°.
Figure 8:
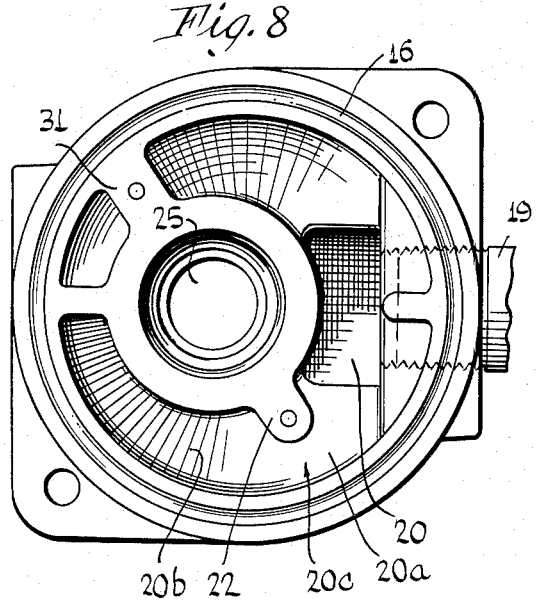
Fig. 8 is a sectional view taken along line 8—8 of Fig. 7.

Should it be desired to provide other than straight-through mounting for the trap, the inlet and outlet ports in the connector part can be formed as desired. For example, as shown in Figs. 7 and 8, the inlet and outlet ports 118, 123 are disposed at 90° with respect to one another. It will be readily apparent that should other angular relations be desired, they can be readily accomplished by so arranging the ports in the connector part.

Inasmuch as the device of the present invention contains no moving parts and is made up of simple castings and stampings, it can be made into a comparatively inexpensive dust trap which can be readily assembled and maintained, and which can be easily inserted into existing lines or new installations without requiring complicated piping.

While the illustrated form of the invention has been described in connection with the removal of dust from illuminating gas, it is to be understood that the device can be utilized for the separation of solid particles from fluids of other types.

Variations and modifications may be made within the scope of the claims and portions of the improvements may be used without others.

We claim:

1. A device for separating solids from a fluid comprising a housing; a partition wall extending across the housing and dividing the housing into a connector part and a trap chamber, said connector part having an inlet port adapted to be connected to an inlet pipe; a curved passage extending from said inlet port to an aperture in said partition wall communicating with said trap chamber, said passage having a restriction therein to increase the velocity of the fluid passing through said passage, the curved portion of said passage causing a swirling action of the fluid whereby the solid particles carried by the fluid are separated from the fluid and dropped therefrom as the fluid passes through said aperture in the partition and into the trap chamber; an outlet in said connector part connecting a second aperture in the partition to an outlet port; and a filter covering said second aperture in the partition to prevent solids being carried from said trap chamber to said outlet port.

2. A dust trap comprising a housing having at least two parts provided with cooperating edge faces secured together and a partition wall extending across the housing and clamped between said edge faces to divide the housing into a connector part and a trap chamber, said connector part having an inlet port adapted to be connected to an inlet pipe and a curved passage extending from said inlet port to an aperture in said partition wall communicating with said trap chamber and said passage having a restriction therein adjacent the inlet end of the passage to increase the velocity of the gas passing through said passage, the curved portion of said passage causing a swirling action of the gas whereby the dust particles carried by the gas are separated from the gas and dropped therefrom as the gas passes through said aperture in the partition wall and into the trap chamber; an outlet port in said connector part adapted to be connected to an outlet pipe and a second passage connecting a second aperture in the partition wall to said outlet port; and a filter covering said second aperture to prevent dust being carried from said trap chamber to said outlet port.

3. A dust trap comprising a pair of castings adapted to be secured together to form a housing, one casting forming a connector part and the other casting being dome-shaped and forming a trap chamber; a partition wall located between said castings and separating the connector part from the trap part, said connector part having an inlet port adapted to be connected to an inlet pipe and having a curved passage cast therein and extending from said inlet port to an aperture in said partition communicating with the trap chamber, said passage having a restriction therein to increase the velocity of the gas passing therethrough, the curved portion of said passage causing a swirling action of the gas whereby the dust particles carried by the gas are separated and dropped therefrom as the gas passes through said aperture in the partition wall and into the trap chamber; an outlet port in said connector part adapted to be connected to an outlet pipe; a second passage separate from said first passage and connecting said outlet port to a second aperture in the partition wall; a filter mounting plate secured to one of the castings; and a filter carried by the plate and covering said second aperture in the partition wall to prevent dust being carried from said trap chamber to said outlet pipe.

4. A dust trap for insertion into a vertically disposed pipe line, comprising a housing having a vertical partition wall extending across the housing and dividing the housing into a connector part and a trap chamber, said connector part having an inlet port at the lower side thereof adapted to be connected to an inlet pipe and a curved passage extending upwardly from said inlet port for substantially 180° to an aperture in the upper part of said partition wall directly communicating with said trap chamber, said passage having a restriction therein adjacent the inlet end of the passage to increase the velocity of the gas passing through said passage, the curved portion of said passage causing a swirling action of the gas whereby the dust particles in the gas are carried through the aperture and are separated from the gas and dropped into the lower part of the trap chamber, said partition wall preventing the dust in the trap chamber from dropping back into the inlet pipe; an outlet port in the upper side of said connector part adapted to be connected to an outlet pipe and a second passage connecting a second aperture in the upper part of the partition wall to said outlet port; and a filter covering said second aperture to prevent dust being carried from said trap chamber to said outlet port.

5. A dust trap for insertion into a horizontally disposed pipe line comprising a housing having a horizontal, planar partition wall extending across the housing and dividing the housing into an upper connector part and a lower, dome-shaped, large trap chamber, said connector part having an inlet port at one side adapted to be connected to an inlet pipe and a curved passage extending from said inlet port and sloping downwardly to an aperture in said partition wall communicating with said trap chamber, said passage having a restriction therein adjacent the inlet end of the passage to increase the velocity of the gas passing through said passage, the curved portion of said passage causing a swirling action of the gas whereby the dust particles carried by the gas are separated from the gas and deposited in the large trap chamber as the gas passes through said aperture in the partition wall and into the trap chamber and the velocity of the gas is decreased; an outlet port in the side of said connector displaced from said inlet port and adapted to be connected to an outlet pipe; a second passage in the connector part connecting a second aperture in the partition wall to said outlet port; and a filter covering said second aperture to prevent dust being carried from said trap part to said outlet port.

6. The invention as defined in claim 2 wherein said cooperating faces are provided with tongue and groove portions and said partition wall has a flexible edge portion engaged by said tongue and groove portion to form a seal between the two housing parts.

7. The invention as defined in claim 2 wherein the inlet and outlet ports are in alignment.

8. The invention as defined in claim 2 wherein the inlet and outlet ports are disposed at 90° with one another.

9. A dust trap comprising a housing having at least two parts provided with side walls having cooperating edges formed with cooperating tongue and groove portions, a neoprene partition wall extending across the housing and dividing the housing into a connector part and a trap chamber; means clamping the parts together with the edge of the partition wall extending between the tongue and groove portions of the cooperating edges of the side walls to form a seal for the housing, said connector part having an inlet port in the side wall thereof adapted to be connected to an inlet pipe; a curved passage extending from said inlet port through substantially 180° to an aperture in said partition wall communicating with said trap chamber, said passage having a restriction therein adjacent the inlet end of the passage to increase the velocity of the gas passing through said passage, the curved portion of said passage causing a swirling action of the gas whereby the dust particles carried by the gas are separated from the gas and dropped therefrom as the gas passes through said aperture in the partition wall and into the trap part; an outlet port in the side wall of said connector part adapted to be connected to an outlet pipe; a second passage in said connector part separate from said first passage and connecting said outlet port to a second aperture in the partition wall; and a filter mounting plate secured to the housing to overlie the partition wall and having a filter of sintered metal thereon covering said second aperture in the partition wall to prevent dust being carried from said trap chamber to said outlet pipe.

References Cited in the file of this patent

UNITED STATES PATENTS

| 1,107,485 | Bowser | Aug. 18, 1914 |
| 1,854,010 | Woodford | Apr. 12, 1932 |
| 2,359,386 | Reinsch | Oct. 3, 1944 |

FOREIGN PATENTS

| 219,981 | Great Britain | Aug. 27, 1925 |